(12) United States Patent
Kasahara et al.

(10) Patent No.: US 7,246,679 B2
(45) Date of Patent: Jul. 24, 2007

(54) VEHICLE STEERING APPARATUS AND METHOD

(75) Inventors: Toshiaki Kasahara, Kanagawa (JP); Kazutaka Adachi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 91 days.

(21) Appl. No.: 11/106,604

(22) Filed: Apr. 15, 2005

(65) Prior Publication Data

US 2006/0037806 A1    Feb. 23, 2006

(30) Foreign Application Priority Data

May 27, 2004    (JP)    ............... 2004-158211

(51) Int. Cl.
*B62D 5/04*    (2006.01)
(52) U.S. Cl. ............... 180/402; 180/443; 701/41; 701/42; 701/43
(58) Field of Classification Search ............... 180/402, 180/443; 701/41, 42, 43
See application file for complete search history.

(56) References Cited

U.S. PATENT DOCUMENTS

| 5,247,441 | A | | 9/1993 | Serizawa et al. | |
|---|---|---|---|---|---|
| 5,999,870 | A | * | 12/1999 | Tatsumi et al. | ............... 701/43 |
| 6,013,994 | A | | 1/2000 | Endo et al. | |
| 6,631,781 | B2 | * | 10/2003 | Williams et al. | ............... 180/443 |
| 6,691,009 | B1 | * | 2/2004 | Yao et al. | ............... 701/41 |
| 6,712,174 | B1 | | 3/2004 | Bohner et al. | |
| 6,718,243 | B1 | * | 4/2004 | Yao et al. | ............... 701/42 |
| 6,751,539 | B2 | * | 6/2004 | Uenuma et al. | ............... 701/41 |
| 6,879,118 | B2 | * | 4/2005 | Cao et al. | ............... 318/34 |
| 7,004,280 | B2 | * | 2/2006 | Shirato et al. | ............... 180/446 |

FOREIGN PATENT DOCUMENTS

| EP | 1 228 941 A2 | 8/2002 |
|---|---|---|
| EP | 1 203 710 A2 | 5/2005 |
| JP | 2003-182619 A | 7/2003 |

\* cited by examiner

*Primary Examiner*—Lesley D. Morris
*Assistant Examiner*—Marlon Arce-Diaz
(74) *Attorney, Agent, or Firm*—Foley & Lardner LLP

(57) ABSTRACT

A vehicle steering apparatus includes a steering reaction actuator that produces a steering reaction force to be applied to the manual steering unit, a steering reaction force controller that outputs a steering reaction force command value to the steering reaction force actuator, and a road surface input torque detector that detects a road surface input torque inputted to steerable road wheels from a road surface, wherein the steering reaction force controller includes a low cut-off frequency filter that extracts a low frequency component equal to or lower than a predetermined frequency from an output of the road surface input torque detector and sets the steering reaction force command value on the basis of a vehicle driving condition and an output of the low cut-off frequency filter. A vehicle steering method is also provided.

11 Claims, 10 Drawing Sheets

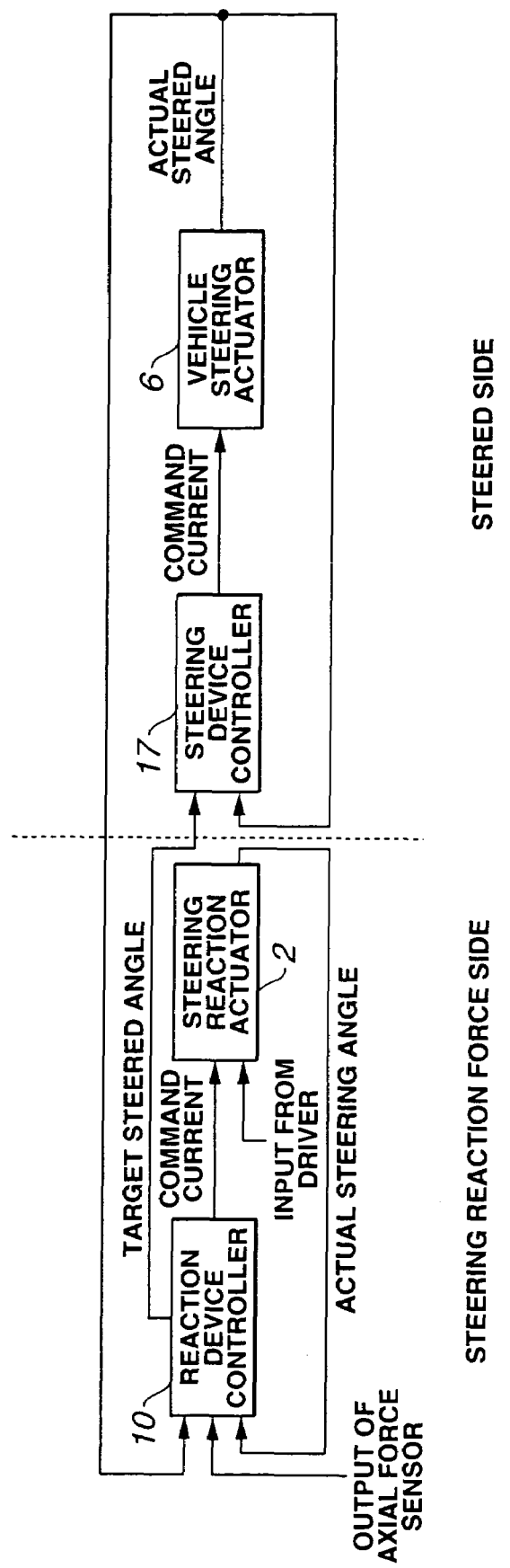

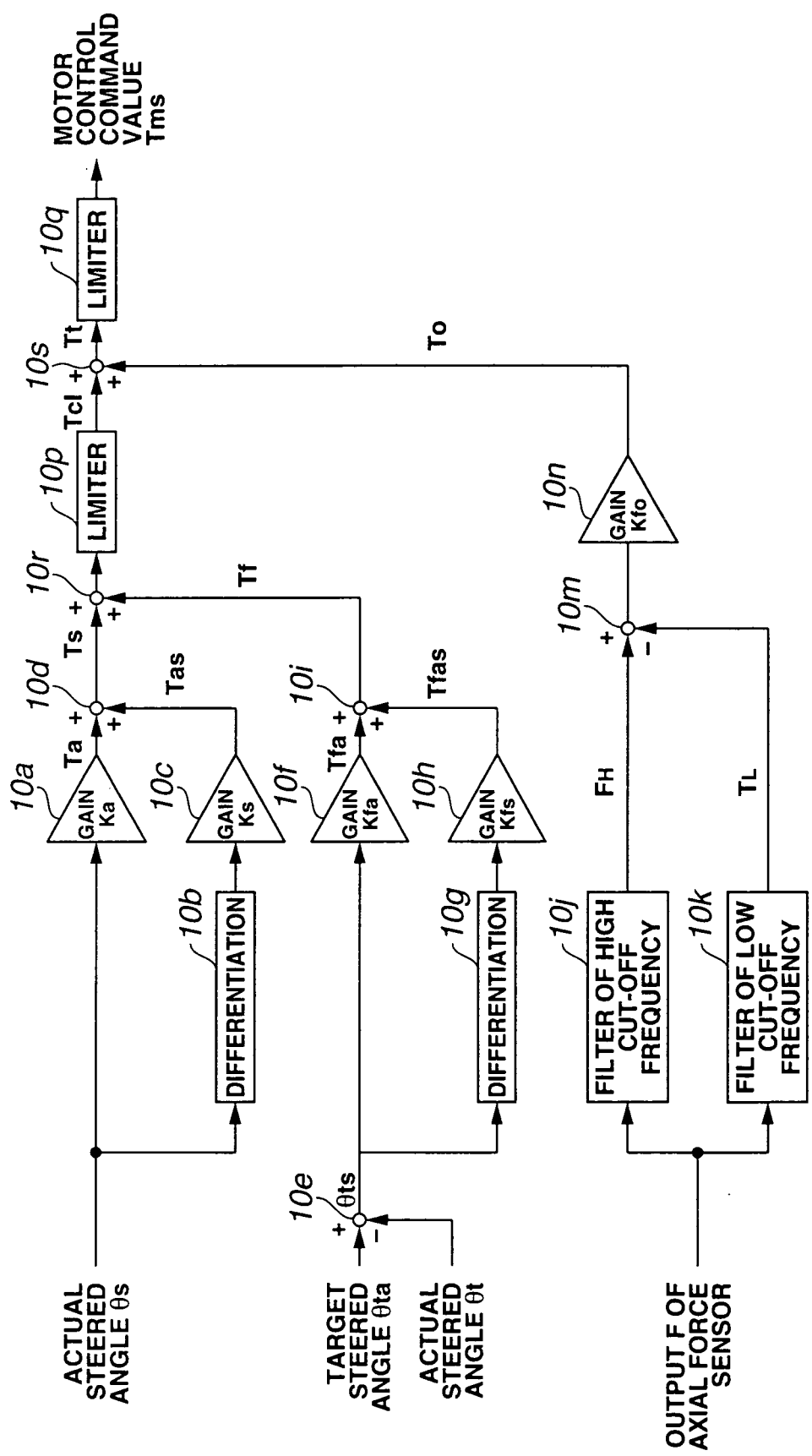

FIG.5A

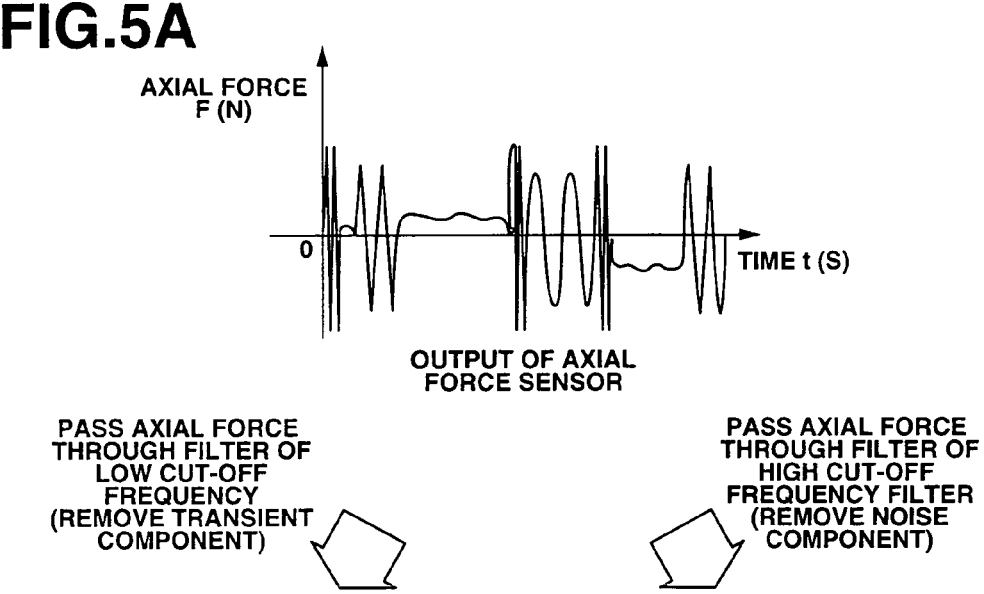

OUTPUT OF AXIAL FORCE SENSOR

PASS AXIAL FORCE THROUGH FILTER OF LOW CUT-OFF FREQUENCY (REMOVE TRANSIENT COMPONENT)

PASS AXIAL FORCE THROUGH FILTER OF HIGH CUT-OFF FREQUENCY FILTER (REMOVE NOISE COMPONENT)

FIG.5B    FIG.5C

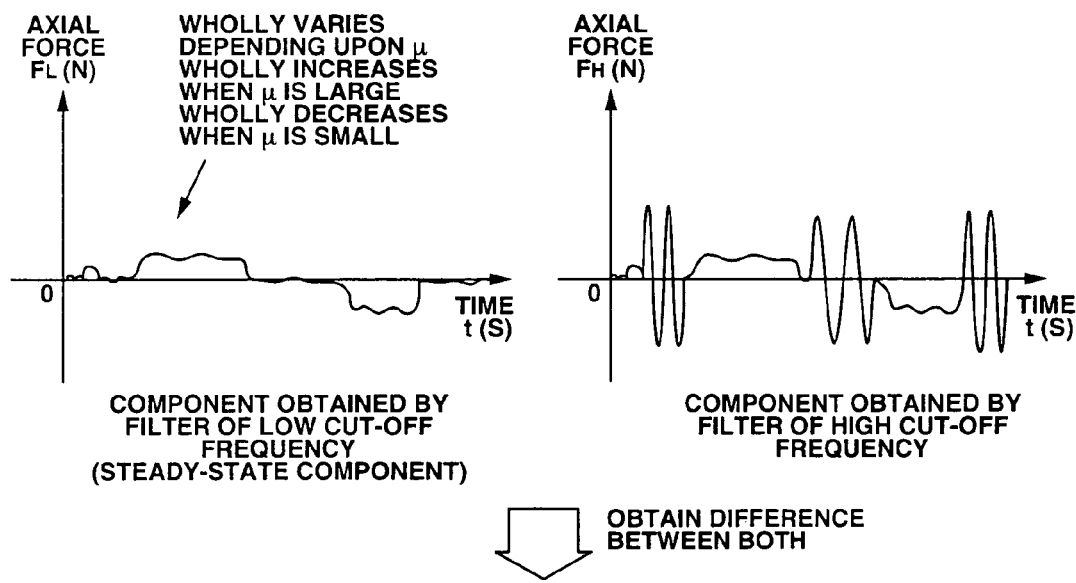

COMPONENT OBTAINED BY FILTER OF LOW CUT-OFF FREQUENCY (STEADY-STATE COMPONENT)

COMPONENT OBTAINED BY FILTER OF HIGH CUT-OFF FREQUENCY

OBTAIN DIFFERENCE BETWEEN BOTH

FIG.5D

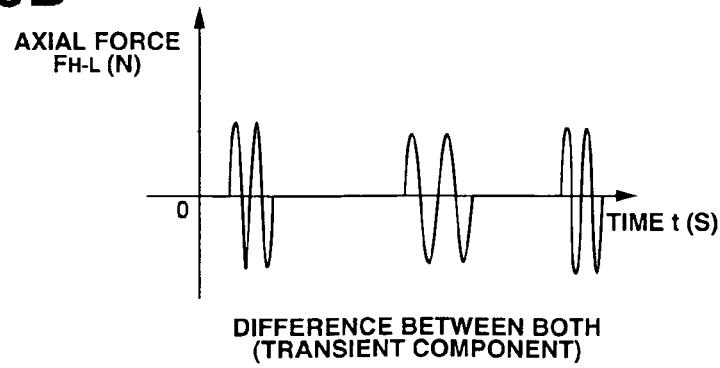

DIFFERENCE BETWEEN BOTH (TRANSIENT COMPONENT)

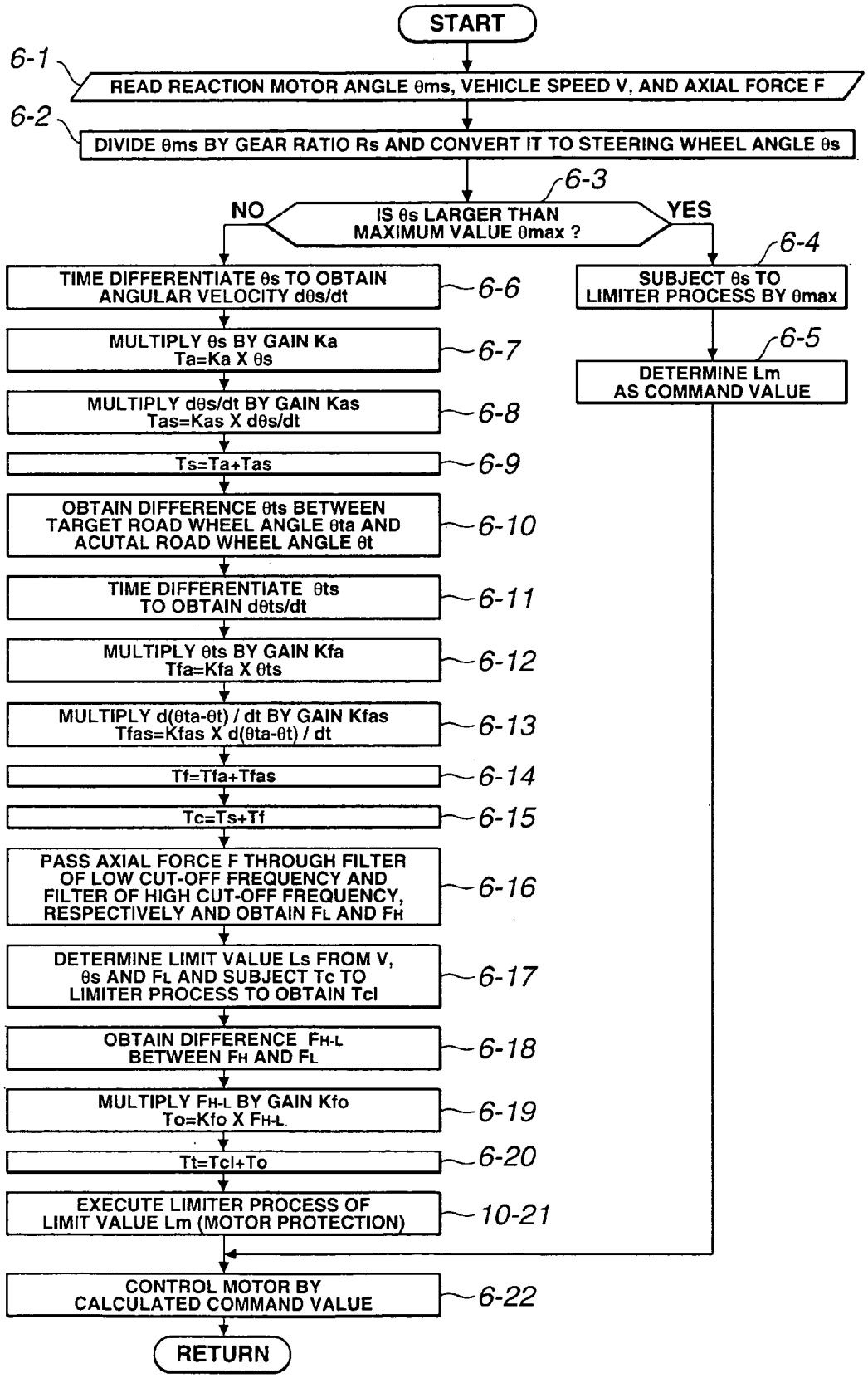

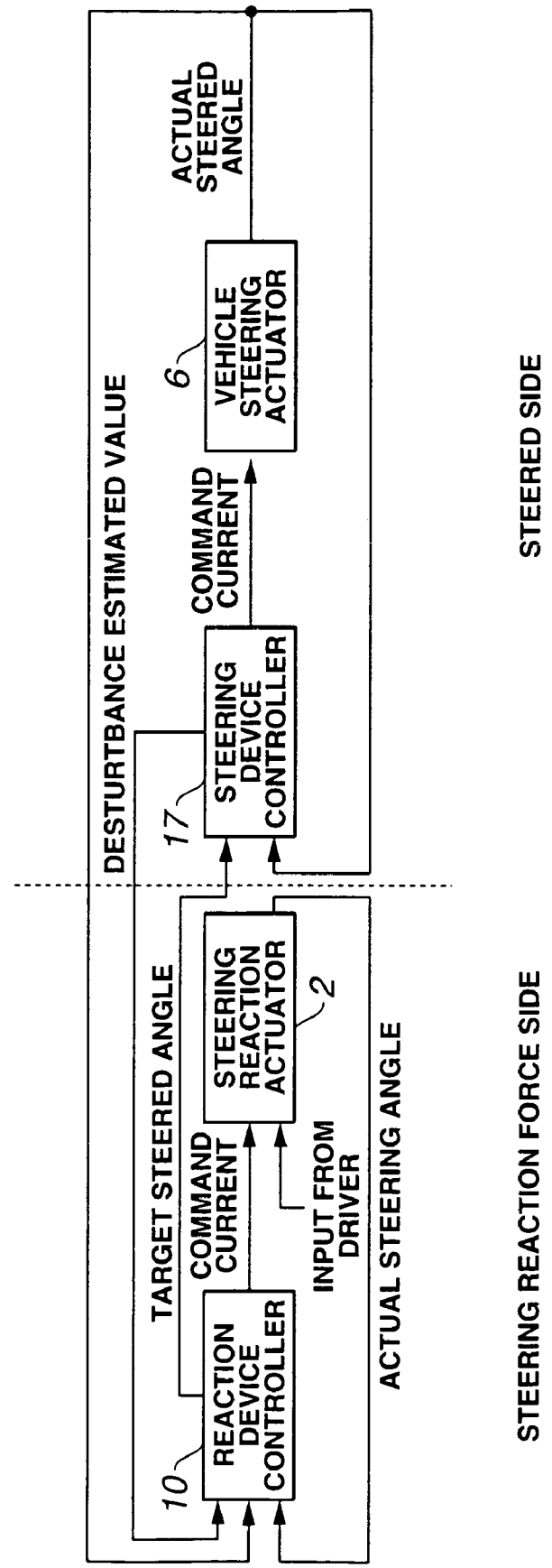

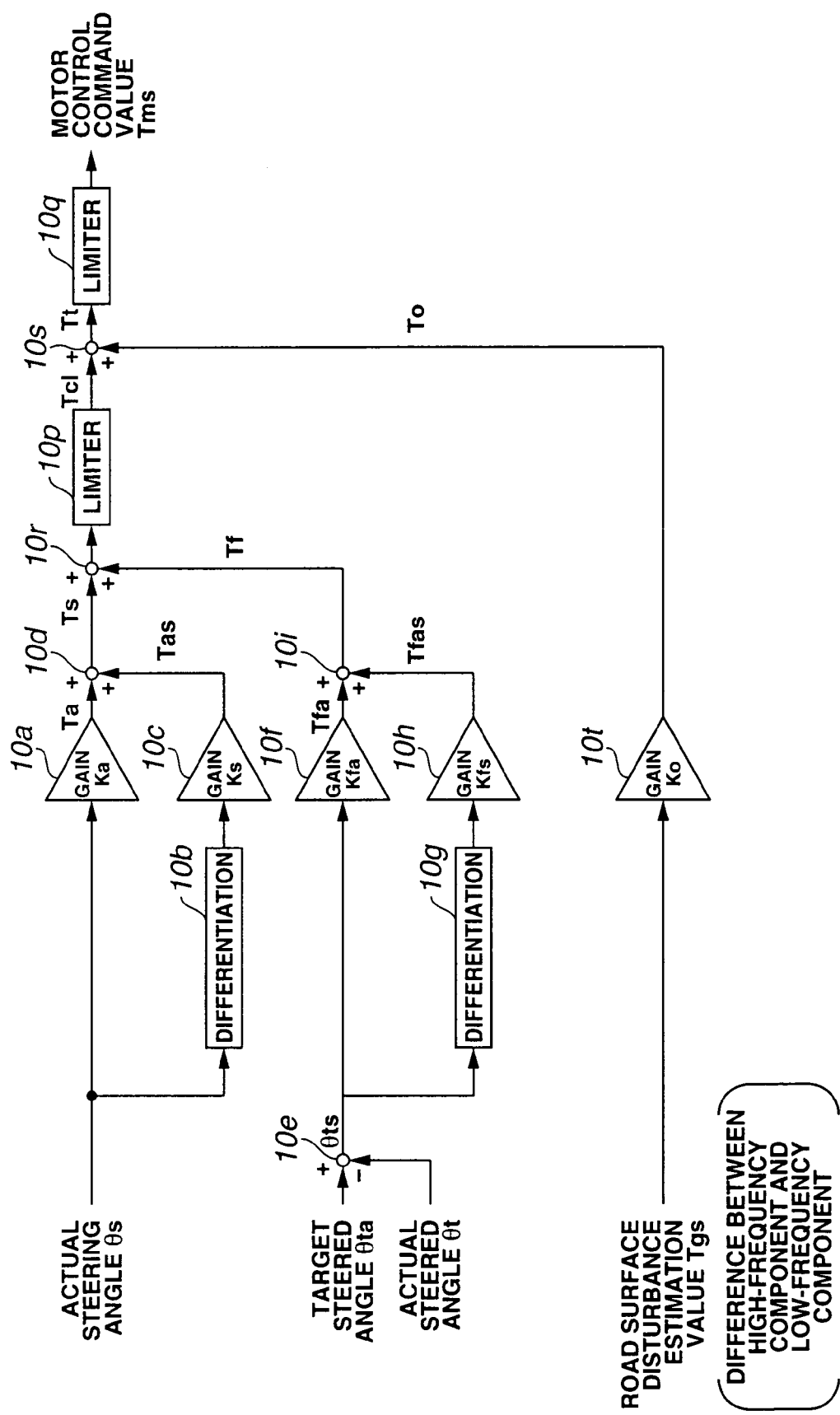

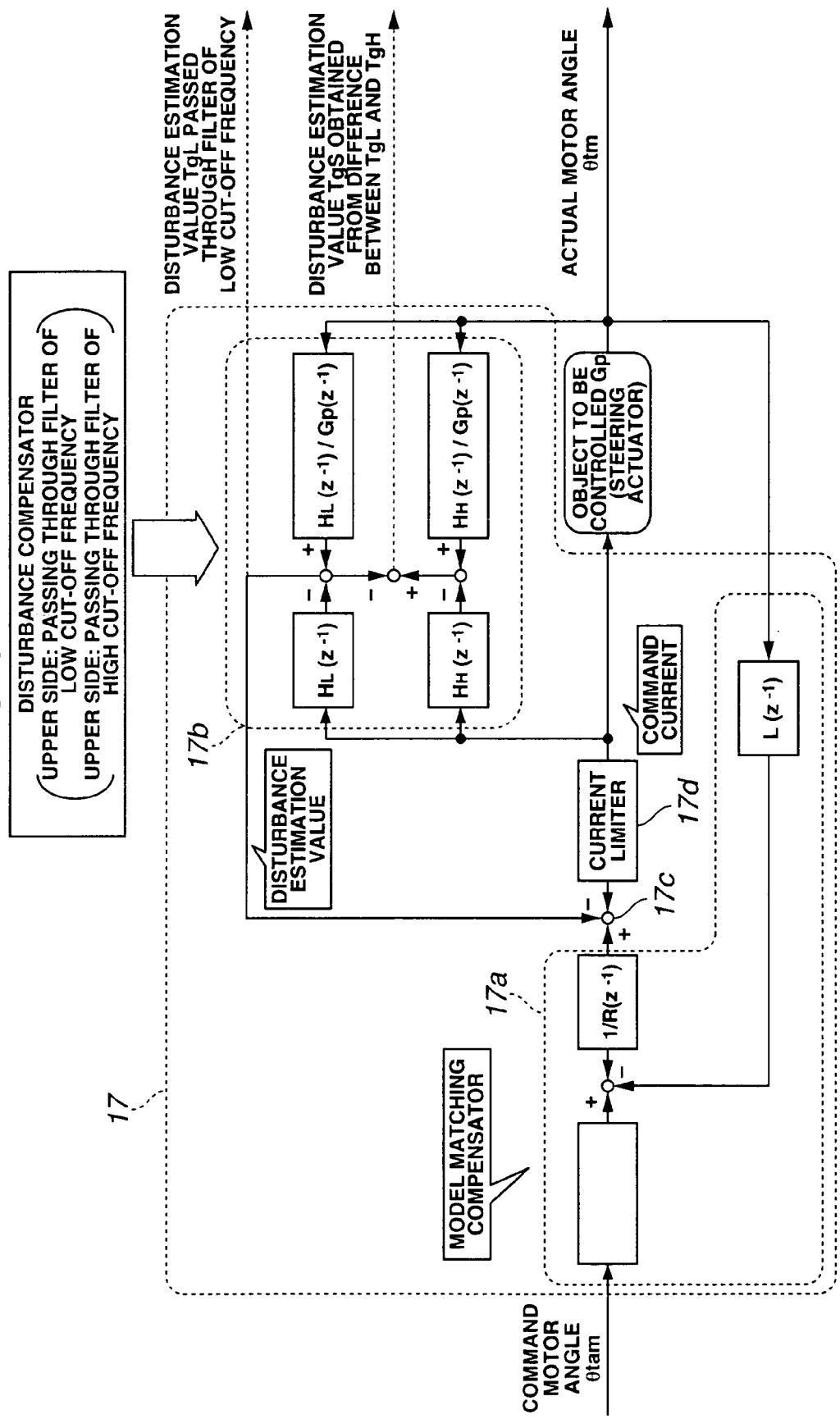

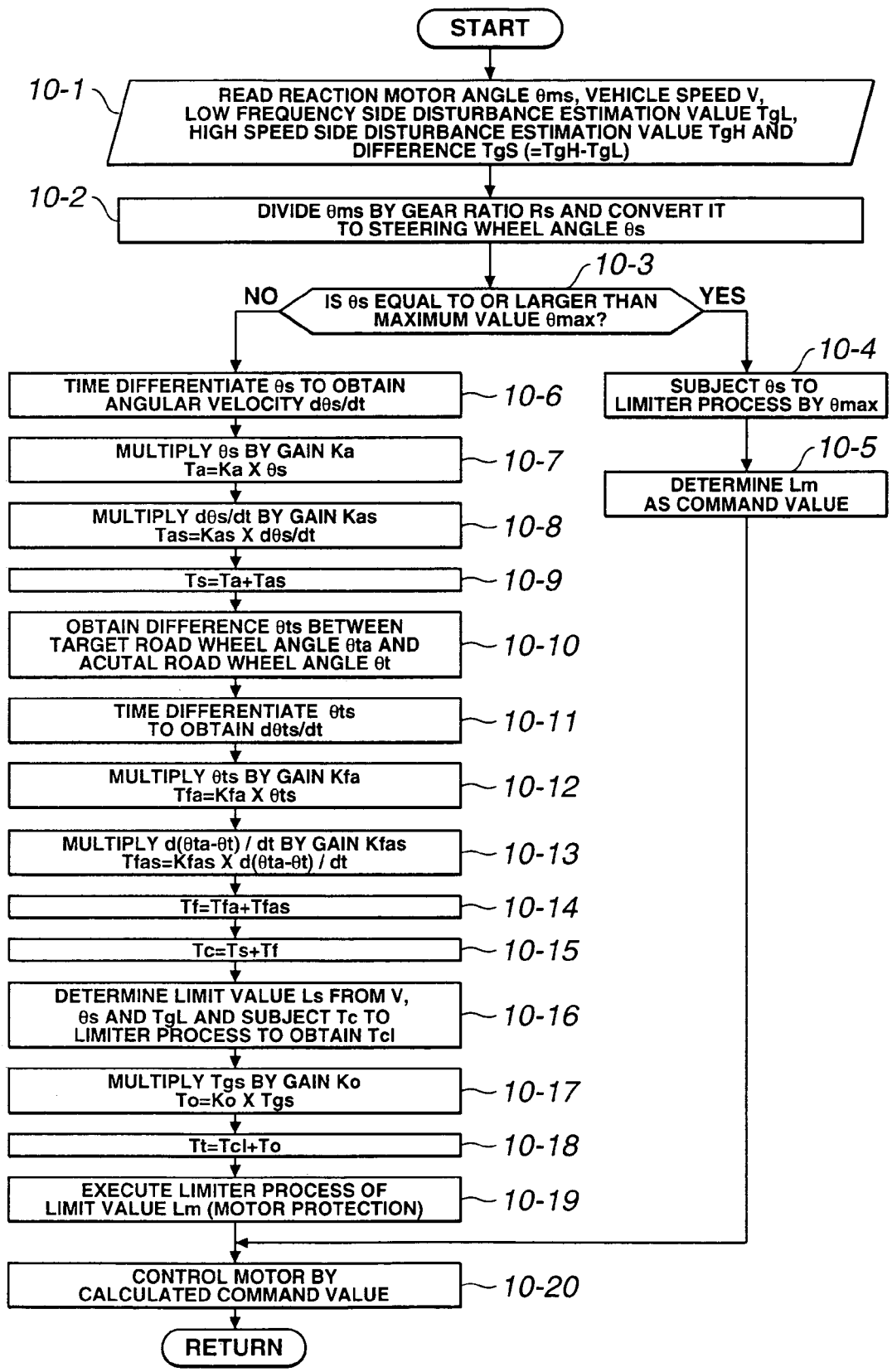

VEHICLE STEERING APPARATUS AND METHOD

BACKGROUND OF THE INVENTION

The present invention relates to a vehicle steering apparatus of the type in which a steering wheel and a steering gear are mechanically separated from each other, i.e., of a so-called steer-by-wire type. The present invention further relates to a steering method for a vehicle having a steering apparatus of the above-described type.

For the purpose of informing a driver of a road surface condition, a conventional vehicle steering apparatus is configured to detect a vibration amplitude of a vibration absorbing member that constitutes part of a suspension system by means of a displacement sensor and thereby applies a supplementary reaction force corresponding to a displacement of the vibration absorbing member in addition to a steering reaction force determined with relation to a vehicle driving condition as disclosed in Unexamined Japanese Patent Publication No. 2003-182619.

SUMMARY OF THE INVENTION

However, the conventional vehicle steering apparatus has a problem that it cannot reflect a variation of a road surface frictional coefficient (road surface μ) on the steering reaction force though it can successfully deal with the undulations of the road surface by a supplemental reaction force corresponding to a detection value of the displacement sensor.

It is accordingly an object of the present invention to provide a vehicle steering apparatus and method that can reflect the road surface μ condition on the steering reaction force and thereby enable a vehicle driver to obtain an accurate information about the road surface μ condition.

To achieve the above object, there is provided according to an aspect of the present invention, a vehicle steering apparatus comprising a steering gear that steers steerable road wheels of a vehicle, a steered angle controller that controls a steered angle of the road wheels, a manual steering unit that is mechanically separated from the steering gear and manually operated for variably controlling a steering angle, a steering reaction force actuator that produces a steering reaction force to be applied to the manual steering unit, a steering reaction force controller that outputs a steering reaction force command value to the steering reaction force actuator, and a road surface input torque detector that detects a road surface input torque inputted to the road wheels from a road surface, wherein the steering reaction force controller includes a low cut-off frequency filter that extracts a low frequency component equal to or lower than a first predetermined frequency from an output of the road surface input torque detector and sets the steering reaction force command value on the basis of a vehicle driving condition and an output of the low cut-off frequency filter.

According to a further aspect of the present invention, there is provided a vehicle steering apparatus comprising a steering gear that steers steerable road wheels of a vehicle, a steered angle controller that controls a steered angle of the road wheels, a manual steering unit that is mechanically separated from the steering gear and manually operated for variably controlling a steering angle, a steering reaction force actuator that produces a steering reaction force to be applied to the manual steering unit, and a steering reaction force controller that outputs a steering reaction force command value to the steering reaction force actuator, wherein the steered angle controller includes a disturbance estimation device that estimates a disturbance and determines a disturbance estimation value, and the steering reaction force controller sets the steering reaction force command value in accordance with a vehicle driving condition and the disturbance estimation value estimated by the disturbance estimation device.

According to a further aspect of the present invention, there is provided a steering method for a vehicle including a steering gear that steers steerable road wheels of a vehicle, a steered angle controller that controls a steered angle of the road wheels, a manual steering unit that is mechanically separated from the steering gear and manually operated for variably controlling a steering angle, a steering reaction force actuator that produces a steering reaction force to be applied to the manual steering unit, and a steering reaction force controller that outputs a steering reaction force command value to the steering reaction actuator, the steering method comprising detecting a road surface input torque inputted to the road wheels from a road surface and producing an output representative thereof, extracting a frequency component equal to or lower than a first predetermined frequency from the output, and setting the steering reaction force command value on the basis of a vehicle driving condition and the output from which the low frequency component lower than the first predetermined frequency is extracted.

According to a further aspect of the present invention, there is provided a steering method for a vehicle including a steering gear that steers steerable road wheels of a vehicle, a steered angle controller that controls a steered angle of the road wheels, a manual steering unit that is mechanically separated from the steering gear and manually operated for variably controlling a steering angle, a steering reaction force actuator that produces a steering reaction force to be applied to the manual steering unit, and a steering reaction force controller that outputs a steering reaction force command value to the steering reaction force actuator, the steering method comprising estimating a disturbance and determining a disturbance estimation value, and setting the steering reaction force command value in accordance with a vehicle driving condition and the disturbance estimation value.

BRIEF DESCRIPTION OF THE DRAWINGS

FIG. 3 is a diagram depicting a control block of the steer-by-wire system to which the vehicle steering apparatus according to the first embodiment is applied;

FIG. 4 is a diagram depicting a control block of a motor control command value calculating means or section of the steering reaction force controller of the vehicle steering apparatus of the first embodiment;

FIGS. 5A to 5D are views showing an operation of a high cut-off frequency filter and a low cut-off frequency filter;

FIG. 6 is a flowchart of a steering reaction force control executed in a reaction device controller of the vehicle steering apparatus of the first embodiment;

FIG. 7 is a diagram depicting a control block of a steer-by-wire system to which a vehicle steering apparatus according to a second embodiment of the present invention is applied;

FIG. 8 is a diagram depicting a control block of a motor control command value calculating means or section of a steering reaction force controller of the vehicle steering apparatus of the second embodiment;

FIG. 9 is a block diagram of a steered angle controller of the vehicle steering apparatus of the second embodiment, that employs a robust model matching technique; and FIG. 10 is a flowchart of a steering reaction force control executed in the steering reaction force controller of the vehicle steering apparatus of the second embodiment.

DESCRIPTION OF THE PREFERRED EMBODIMENTS

Figure 1:
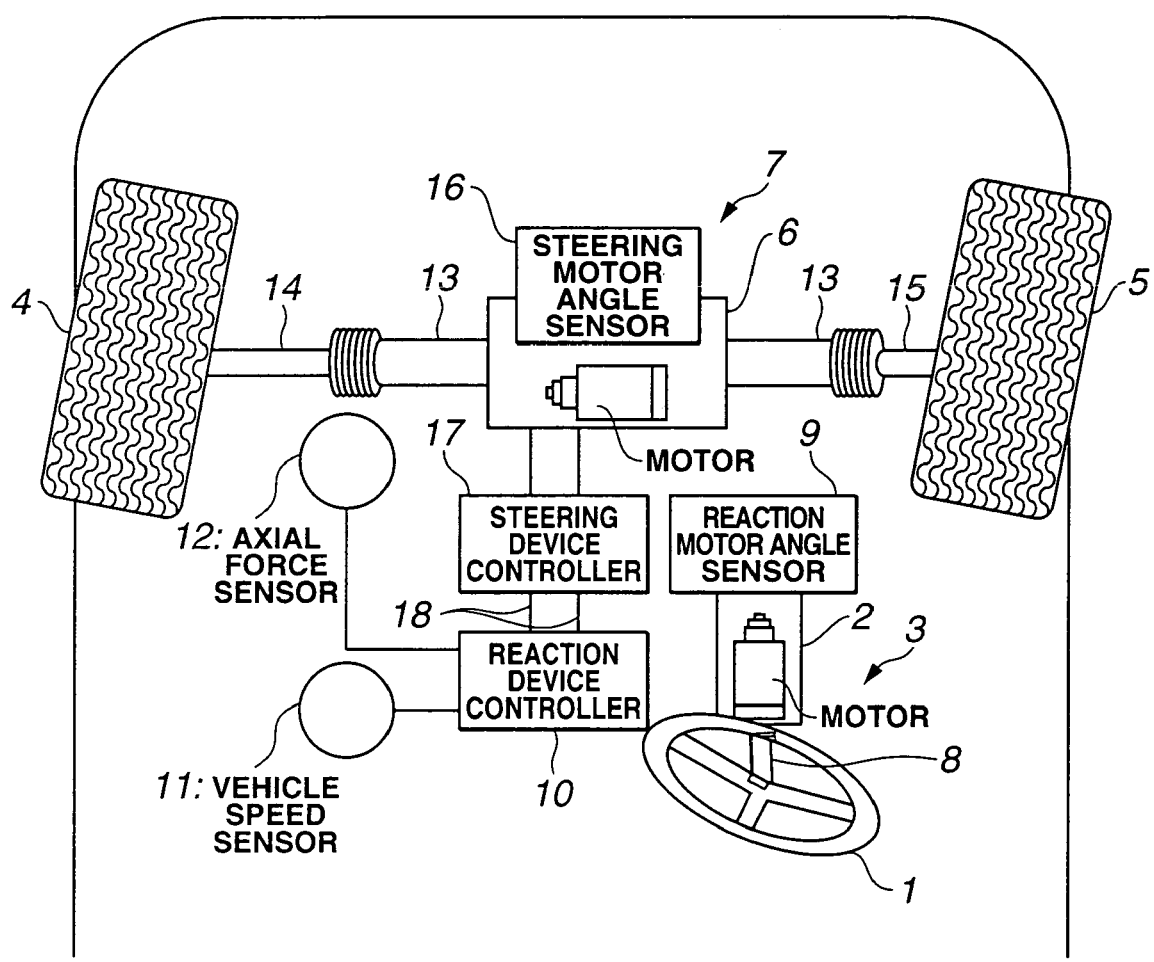
FIG. 1 is a schematic block diagram of a steer-by-wire system to which a vehicle steering apparatus according to a first embodiment of the present invention is applied.
Figure 1:
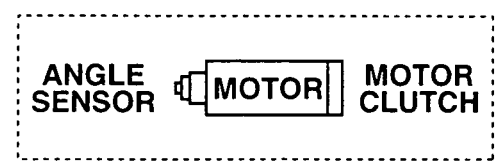
Figure 2:
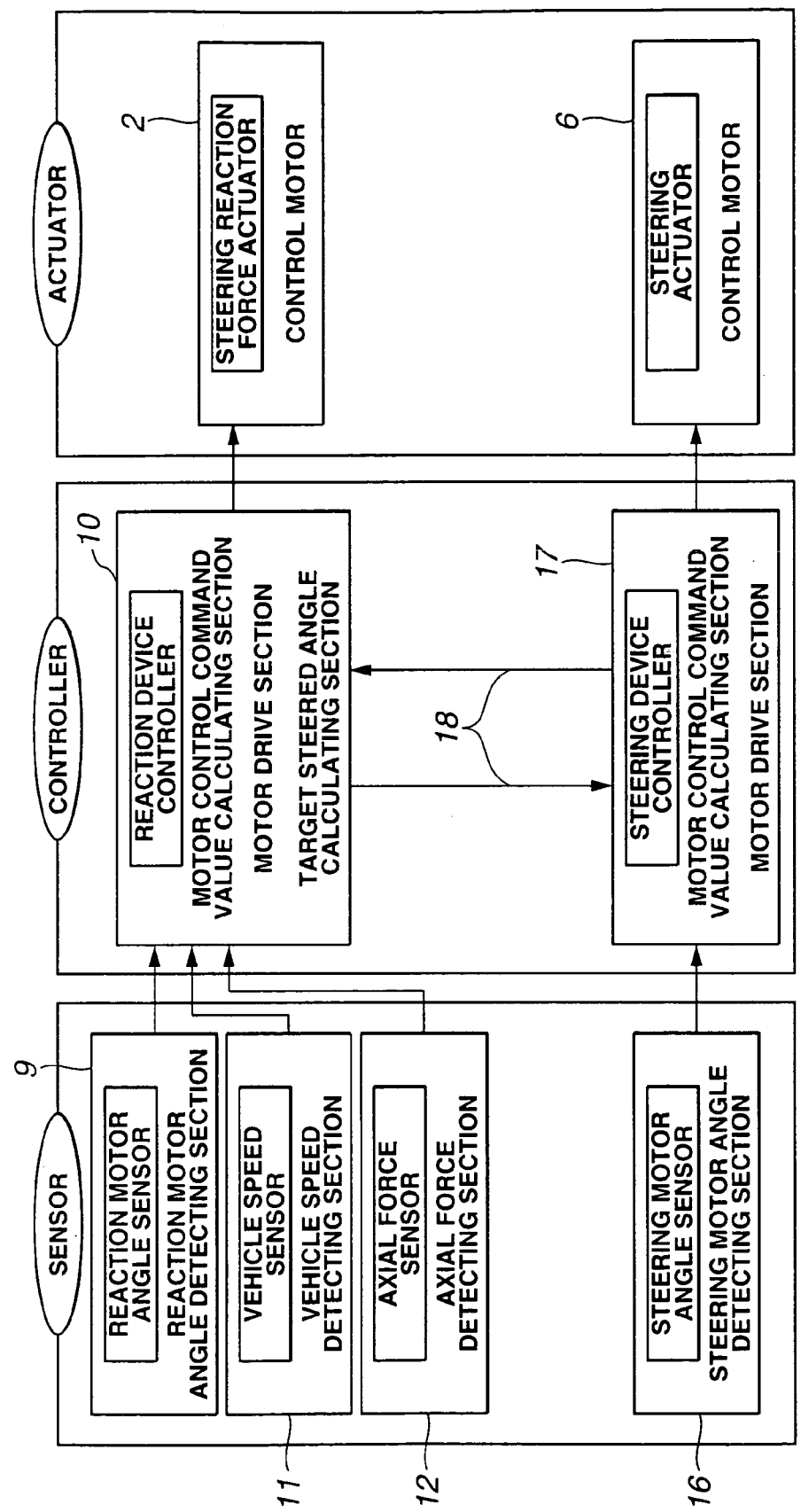
FIG. 2 is a block diagram of a steering reaction force controller and a steered angle controller of the vehicle steering apparatus of the first embodiment.

Referring first to FIGS. 1 and 2, a steer-by-wire system to which a vehicle steering apparatus according to a first embodiment of the present invention is applied is constructed so that a steering reaction device 3 having a steering wheel (manual steering means or unit) 1 and a steering reaction force actuator 2 is mechanically separated from a vehicle steering device 7 having steerable road wheels 4, 5 and a vehicle steering actuator 6.

Steering reaction device 3 includes, in addition to steering wheel 1 and steering reaction force actuator 2, a steering column shaft 8 to which steering reaction force actuator 2 is provided by way of a reduction gear mechanism (not shown).

Steering reaction force actuator 2 is a motor having a clutch and has a motor shaft to which a reaction motor angle sensor 9 that serves as a reaction motor angle detecting means or section is provided.

As an electronic control means for controlling steering reaction force actuator 2 is provided a reaction device controller 10 (steering reaction force control means or controller). To reaction device controller 10 is inputted an information from steering reaction motor angle sensor 9, vehicle speed sensor (vehicle speed detection means or section) 11, and an axial force sensor (axial force detecting means or section) 12 for detecting an axial force acting on a rack shaft of a steering gear 13 of vehicle steering device 7. Axial force sensor 12 is used as a road surface input torque detecting means or detector for detecting a road surface input torque inputted to steerable wheels 4, 5 from a road surface.

Reaction device controller 10 includes a motor control command value calculating means or section for calculating a motor control command value Tms by subjecting a motor torque command value Tm that is the sum of an equivalent steering input torque Ts and an equivalent steering output torque Tf to a limiter process, a motor drive means or section for converting the motor control command value Tms to a command current to be supplied to steering reaction force actuator 2 by means of a motor drive circuit, and a target steered angle calculating means or section for calculating a target steered angle of steerable wheels 4, 5 from the output of steering reaction motor angle sensor 9.

In vehicle steering device 7, steering gear 13 is driven by vehicle steering actuator 6, and steerable wheels 4, 5 are connected to opposite end portions of steering gear 13 by way of motion converting mechanisms 14, 15.

Vehicle steering actuator 6, similarly to steering reaction force actuator 2, is a motor having a clutch and is provided with a steering motor angle sensor 16 constituting a steering motor angle detecting means or section for detecting the number of rotation of a motor shaft.

As an electronic control means for controlling vehicle steering actuator 6 is provided a steering device controller (steered angle control means or controller) 17 which is connected to reaction device controller 10 by means of a two-way communication line 18 for exchange of information. To steering device controller 17 is inputted an input information from steering motor angle sensor 16.

Steering device controller 17 includes a motor control command value calculating means or section for calculating a motor control command value by a target steering angle, a model matching compensator and an electronic current limiter, and a motor drive means or section for driving a motor by a motor drive circuit that converts a motor drive command value to a command current to be supplied to vehicle steering actuator 6.

FIG. 3 shows a steer-by-wire system to which the vehicle steering apparatus of the first embodiment is applied.

The steer-by-wire system can be divided into a steering reaction force side including reaction device controller 10 and steering reaction force actuator 2 and a steered side including steering device controller 17 and vehicle steering actuator 6.

Reaction device controller 10 is supplied with, as an input, an actual steered angle from vehicle steering actuator 6, an actual steering angle from steering reaction force actuator 2 and an axial force from an axial force sensor 12. Reaction device controller 10 outputs a command current to steering reaction force actuator 2 and a target steered angle to steering device controller 17.

Steering reaction force actuator 2 is supplied with, as an input, the command current from reaction device controller 10 and a steering force from a driver and outputs an actual steering angle to reaction device controller 10.

Steering device controller 17 is supplied with, as an input, a target steered angle from reaction device controller 10 and an actual steered angle from vehicle steering actuator 6 and outputs a command current to vehicle steering actuator 6.

Vehicle steering actuator 6 is supplied with, as an input, the command current from steering device controller 17 and outputs the actual steered angle to reaction device controller 10 and steering device controller 17.

FIG. 4 is a diagram depicting a control block of a motor control command value calculating means or section of reaction device controller 10 of the vehicle steering apparatus.

First, reaction device controller 10 includes a calculating section for calculating an equivalent steering input torque (i.e., torque equivalent to steering input) Ts, a calculating section for calculating an equivalent steering output torque (i.e., torque equivalent to steering output) Tf, a calculating section for calculating an equivalent road surface μ torque (i.e., torque equivalent to road surface μ) To that varies transiently, a first limiter process section 10p and a second limiter process section 10q.

The calculating section for calculating equivalent steering input torque Ts includes a gain setting device 10a for obtaining a torque Ta by multiplying equivalent steering input torque Ts by gain Ka, a differentiator 10b for time differentiating actual steering angle θs, a gain setting device 10c for obtaining a torque Tas by multiplying actual steering angle θs by gain Kas and an adder 10d for calculating equivalent steering input torque Ts by adding Tas to Ta.

$$Ts = Ta + Tas = Ka \cdot \theta s + Ks \cdot d\theta s/dt$$

The calculating section for calculating equivalent steering output torque Tf includes a difference calculator 10e for calculating the steered angle difference θts between target steered angle θta and actual steered angle θt, a gain setting device 10f for obtaining torque Tfa by multiplying steered angle difference θts by gain Kfa, a differentiator 10g for time differentiating steered angle difference θts, a gain setting device 10h for obtaining torque Tfs by multiplying a differentiated value of steered angle difference θts by gain Kfas, and an adder 10i for calculating equivalent steering output torque Tf by adding Tfas to Tfa.

$$\theta ts = |\theta ta - \theta t|$$

$$Tf = Tfa + Tfas = Kfa \cdot \theta ts + Kfs \cdot d\theta ts/dt$$

The calculating section for calculating equivalent road surface μ torque To includes a high cut-off frequency filter 10j for extracting a frequency component $F_H$ equal to or lower than a second predetermined frequency from output F of axial force sensor 12, a low cut-off frequency filter 10k for extracting a frequency component $F_L$ equal to or lower than a first predetermined frequency (that is lower than the second predetermined frequency), a difference calculator 10m for obtaining the difference $F_{H-L}$ between the two components $F_H$, $F_L$, and a gain setting device 10n for calculating an equivalent road surface μ torque To by multiplying difference $F_{H-L}$ by a gain Kfo.

$$To = Kfo \times (F_H - F_L)$$

Second predetermined frequency (cut-off frequency) is set at such a value that the frequency range of the extracted frequency component does not include a high frequency range in which a noise component is largely included. Accordingly, the noise component is cut off by the effect of the filter and is not reflected on the steering reaction force, thus making it possible to prevent the driver from having a strange feel with respect to the steering operation.

First limiter processing section 10p subjects Tc that is obtained by calculating the sum of equivalent steering input torque Ts and equivalent steering output torque Tf by means of adder 10r, to a limiter process (limit value Ls) and generates Tcl.

$$Tc = Ts + Tf$$

In this connection, limit value Ls is set from vehicle speed V and steering angle θs so that the steering reaction force does not become too or excessively large even when steering angle θs and steering wheel angular velocity dθs/dt become large and additionally from low frequency component $F_L$ of axial force F so that the steering force has a steady state road surface μ variation portion.

Second limiter processing section 10q calculates motor control command value Tms by subjecting Tt that is obtained by calculating the sum of Tcl and equivalent road surface torque To by means of adder 10s, to a limiter process (limit value Lm).

In this connection, limit value Lm is set so as not to become equal to or larger than the rating of steering reaction force actuator 2.

The operation of the vehicle steering apparatus will be described.

[Calculation of Equivalent Road Surface μ Torque]

Equivalent road surface μ torque calculating section obtains such component $F_L$ as shown in FIG. 5B by passing axial force F shown in FIG. 5A that is the output of axial force sensor 12 through low cut-off frequency filter 10k. Further, equivalent road surface μ torque calculating section obtains such component $F_H$ as shown in FIG. 5C by passing axial force F through high cut-off frequency filter 10j.

Then, difference calculator 10m obtains such difference $F_{H-L}$ as shown in FIG. 5D by subtracting component $F_L$ from component $F_H$ and road surface equivalent torque that varies transiently by passing $F_{L-H}$ through gain setting device 10n.

[Steering Reaction Force Control Process]

FIG. 6 shows a steering reaction force control process executed in reaction device controller 10 of vehicle steering apparatus 1 of this embodiment. Hereinafter, description will be made as to each step of the control process.

In step 6-1, reaction motor angle θms from reaction motor angle sensor 9, vehicle speed V from vehicle speed sensor 11 and axial force F from axial force sensor 12 are read. Then, the control proceeds to step 6-2.

In step 6-2, reaction motor angle θms is divided by reduction gear ratio Rs between motor (actuator) 2 and steering column shaft 8 and is thereby converted to steering angle θs (θs=θms/Rs) Then, the control proceeds to step 6-3.

In step 6-3, it is determined whether steering angle θs obtained by the conversion in step 6-2 is equal to or larger than maximum value θmax that is determined by a displaceable amount of a steered side displacement member. When the answer is affirmative, the control proceeds to step 6-4. When the answer is negative, the control proceeds to step 6-6. In the meantime, in case the steering gear ratio between steering side and steered side is variable, maximum value θmax is determined by consideration of the gear ratio.

In step 6-4, if it is determined in step 6-3 that steering angle θms is equal to or larger than maximum value θmax, steering angle θs is subjected to a limiter process of limit value Lm, and the control proceeds to step 6-5.

In step 6-5, limit value Lm obtained in step 6-4 is determined as motor control command value Tms. By this, steering angle θs is held constantly at maximum value θmax. At the same time, the steering reaction force is made larger in a pulse-like manner as compared with that at usual (step 6-22). Then, the control returns to step 6-1.

In step 6-6, if it is determined in step 6-3 that steering angle θs is smaller than maximum value θmax, steering angle θs obtained in step 6-2 is time differentiated thereby calculating steering wheel angular velocity dθs/dt, and the control proceeds to step 6-7.

In step 6-7, steering angle θs obtained in step 6-2 is multiplied by gain Ka that is calculated based on a target response and damping coefficient that are previously determined by vehicle speed V, thereby calculating angle term torque Ta (Ta=Ka×θs), and the control proceeds to step 6-8.

In step 6-8, steering wheel angular velocity dθs/dt obtained in step 6-6 is multiplied by gain Kas that is calculated based on the target response and damping coefficient having been previously determined from vehicle speed V, thereby calculating angular velocity term torque Tas (Tas=Kasxdθs/dt). Then, the control proceeds to step 6-9.

In step 6-9, the sum of angle term torque Ta and angular velocity term torque Tas obtained in steps 6-7, 6-8 is calculated and the result of calculation is expressed as Ts (Ts=Ta+Tas). Then, the control proceeds to step 6-10.

In step 6-10, the difference θts between target steered angle θta and actual steered angle θt is calculated and the control proceeds to step 6-11.

In step 6-11, the difference θts between target steered angle θta and actual steered angle θt obtained in step 6-10 is time differentiated to obtain dθts/dt, and the control proceeds to step 6-12.

In step 6-12, the difference θt between target steered angle θta and actual steered angle θt obtained in step 6-10 is multiplied by gain Kfa corresponding to vehicle speed V and the result of calculation is expressed as Tfa. Then, the control proceeds to step 6-13.

In step 6-13, dθts/dt that is obtained by time differentiating θts in step 6-10 is multiplied by gain Kfas corresponding to vehicle speed V, and the result of calculation is expressed as Tfas (Tfas=Kfasxdθts/dt). Then, the control proceeds to step 6-14.

In step 6-14, the sum of Tfa and Tfas that are obtained in steps 6-12, 6-13 is calculated and the result of calculation is expressed as Tf (Tf=Tfa+Tfas). Then, the control proceeds to step 16-15.

In step 6-15, Tf obtained in step 6-14 is added to Ts obtained in step 6-9, and the result of calculation is expressed as Tc (Tc=Ts+Tf). Then, the control proceeds to step 6-16.

In step 6-16, axial force F read in step 6-1 is passed through low cut-off frequency filter 10$k$ whose cut-off frequency (first predetermined frequency) is for example set at a value ranging from 3 to 5 Hz and through high cut-off frequency filter 10$j$ whose cut-off frequency (second predetermined frequency) is for example set at a value ranging from 30 to 50 Hz, and outputs from the filters are expressed as $F_L$ and $F_H$, respectively. Then, the control proceeds to step 6-17.

In step 6-17, Tc obtained in step 16-15 is subjected to a limiter process by using a limit value Ls that is obtained from vehicle speed V and steering angle θs read in step 6-1 and from $F_L$ obtained in step 6-16, and the result of processing is expressed as Tcl. Then, the control proceeds to step 6-18.

In step 6-18, the difference between $F_H$ and $F_L$ obtained in step 6-16 is calculated and the result of calculation is expressed as $F_{H-L}$ ($F_{H-L}=F_H-F_L$). Then, the control proceeds to step 6-19.

In step 6-19, $F_{H-L}$ obtained in step 6-18 is multiplied by gain Kfo and the result of calculation is expressed as To (To=KfoxF$_{H-L}$). Then, the control proceeds to step 6-20.

In step 6-20, To obtained in step 6-19 is added to Tcl obtained in step 6-17 and the result of calculation is expressed as Tt (Tt=Tcl+To). Then, the control proceeds to step 6-21.

In step 6-21, Tt obtained in step 6-20 is subjected to a limiter process of limit value Lm that is previously determined for protection of the motor, thereby calculating motor control command value Tms. Then, the control proceeds to step 6-22.

In step 6-22, a control of steering reaction force actuator 2 is executed based on motor control command value Tms and the control is returned to step 6-1 for another cycle of equivalent road surface μ torque calculation.

[Operation for Steering Reaction Force Control]

In case steering angle θs is smaller than maximum value θmax that is determined based on the displaceable amount of a steered side displacement member, the control proceeds, in the flow chart of FIG. 6, in the order of step 6-1, step 6-2, step 6-3, step 6-6, step 6-7, step 6-8 and step 6-9. In step 6-9, the sum of angle term torque Ta obtained in step 6-7 and angular velocity term torque Tas obtained in step 6-8 is calculated, thereby calculating equivalent steering input torque Ts.

Then, the control proceeds from step 6-9 the order of step 6-10, step 6-11, step 6-12, step 6-13 and step 6-14. In step 6-14, the sum of angle difference term torque Tfa obtained in step 6-12 and differentiated angle difference term torque Tfas obtained in step 6-13 is calculated, thereby calculating equivalent steering output torque Tf.

In step 6-15, equivalent steering input torque Ts obtained in step 6-9 and equivalent steering output torque Tf obtained in step 6-14 are added together, thereby calculating Tc. Then, in step 6-16, axial force F read in step 6-1 is passed through low cut-off frequency filter 10$k$ and high cut-off frequency filter 10$j$, thereby calculating $F_L$ and $F_H$.

Then, in step 6-17, Tc obtained in step 6-15 is subjected to a limiter process by using a limit value Ls that is obtained from vehicle speed V and steering angle θs and from $F_L$ obtained in step 6-16.

Thus, it becomes possible to prevent the steering reaction force from becoming too or excessively large when steering angle es and steering wheel angular velocity dθs/dt become large, thereby preventing steering wheel 1 from becoming unable or difficult to be turned further by the driver and making it possible to attain desired steering reaction characteristics corresponding to vehicle characteristics.

Further, since limit value Ls is variable by consideration of low frequency component $F_L$ of axial force F in addition to vehicle speed V and steering angle θs, Tcl reflecting a steady stage condition can be calculated. For this reason, when a variation of road surface μ causes a variation of the value of the steady state condition, it becomes possible to calculate a steering reaction force in response to the variation of the road surface μ.

Then, the control proceeds from step 6-17 in the order of step 6-18 and step 6-19. In step 6-19, by multiplying the difference $F_{H-L}$ between $F_H$ and $F_L$ obtained in step 6-18 by gain Kfo, equivalent road surface torque To that varies transiently is calculated.

Thus, since a transient variation portion that is cut off from the steady state portion is added to the steering reaction force as one component thereof, the driver can receive an accurate information about the input from the road surface or the outside of the vehicle that varies transiently (i.e., information about undulations of the road surface, etc.).

Then, the control proceeds from step 6-19 in the order of step 6-20, step 6-21 and step 6-22. In step 6-21, Tt obtained in step 6-20 is subjected to a limiter process of limit value Lm, thereby calculating motor control command value Tms. In step 6-22, a motor control of steering reaction force actuator 2 based on motor control command value Tms is executed.

Thus, in case a motor control command value that is equal to or larger than the rating of steering reaction force actuator 2 is calculated, the motor control command value is subjected to a limiter process, thus making it possible to prevent an excessively large current from flowing through the motor and thereby protect the motor.

In case steering angle θs is equal to or larger than maximum value θmax that is determined depending upon the displaceable amount of a steered side displacement member, the control proceeds, in the flowchart of FIG. 6, in the order of step 6-1, step 6-2, step 6-3, step 6-4 and step 6-5. In step 6-4, steering angle θs is subjected to a limiter process of limit value Lm. In step 6-5, steering angle θs is held constantly at θmax and the steering reaction force is increased in a pulse-like manner as compared with that at the time of usual control.

Accordingly, by increasing the steering reaction force in a pulse-like manner as compared with that at the time of usual control, it becomes possible to inform the driver of the steering wheel being steered to the maximum steering angle and prevent excessive steering of steering wheel 1 by the driver.

Further, since the command value for the steered angle is determined by steering angle θs, the limiter process to which steering angle θs is subjected makes it possible to prevent the steered side displacement member from striking against a stopper.

The vehicle steering apparatus of the present invention has the following effects.

(1) Since there are provided axial force sensor 12 for detecting an axial force acting on the rack shaft of steering gear 13 and low cut-off frequency filter 10k for extracting, from the output F of axial force sensor 12, a frequency component equal to or lower than a first predetermined frequency, and reaction device controller 10 sets limit value Lm for limiting a steering reaction force in accordance with a vehicle driving condition (vehicle speed V and steering angle θs) and the output $F_L$ of low cut-off filter 10k and determines motor control command value Tms, it becomes possible to produce a steering reaction force corresponding to the steady state road surface μ and inform the driver of a road surface condition accurately.

(2) Since there is provided high cut-off frequency filter 10j for extracting, from output F of axial force sensor 12, a frequency component lower than a second predetermined frequency that is higher than the first predetermined frequency, and reaction device controller 10 is configured to add equivalent road surface μ torque To corresponding to the difference $F_{H-L}$ between output $F_H$ of high cut-off frequency filter 10j and output $F_L$ of low cut-off frequency filter 10k to equivalent steering input torque Ts and equivalent steering output torque Tf corresponding to a vehicle driving condition (vehicle speed V and steering angle θs), a transient variation portion that is cut off from a steady state portion is added to a steering reaction force as one component thereof, the driver can obtain an accurate information about the input from the road surface or the outside of the vehicle that varies transiently (i.e., information about undulations of the road surface, etc.).

(3) Since reaction device controller 10 is configured to hold steering angle θs constantly at maximum steering angle θmax when steering angle θs reaches maximum steering angle θmax, and the steering reaction force is processed so as to increase in a pulse-like manner, it becomes possible to inform the driver of the steering angle being the maximum steering angle and prevent excessive steering of steering wheel 1 by the driver and the steered side displacement member from striking against the stopper.

(4) Since steering reaction force actuator 2 is made up of a motor having a clutch, the clutch can be disengaged at the time of reckless driving of the motor for preventing an excessively large reaction force from being produced.

(5) Since the road surface input torque detecting section for detecting the road surface input torque inputted from the road surface to steerable wheels 4, 5 consists of axial force sensor 12 for detecting an axial force inputted to the rack shaft of steering gear 13, the driver can obtain an accurate information about the road surface condition. Further, a low cost can be realized as compared with the conventional apparatus having a displacement sensor for detecting an amplitude of vibration of a vibration absorbing member.

Referring to FIGS. 7 to 10, a vehicle steering apparatus according to a second embodiment of the present invention will be described.

The second embodiment differs from the first embodiment in that steering device controller 17 is provided with a disturbance estimation section that functions as a road surface detecting section for detecting the road surface input torque inputted from the road surface to steerable road wheels 4, 5. Thus, in FIGS. 7 to 10, similar parts and portions to those of the first embodiment are designated by like reference characters and repeated description thereof is omitted for brevity.

Reaction device controller 10 feeds only a disturbance estimation value from steering device controller 17 on the steered side (i.e., road wheel side) back to the steering reaction force side (i.e., steering side), and receives, as an input, the actual steered angle from vehicle steering actuator 6 and the actual steering angle from steering reaction force actuator 2. Reaction device controller 10 outputs command current to steering reaction force actuator 2 and a target steered angle to steering device controller 18.

FIG. 8 is a diagram depicting a control block of a motor control command value calculating means or section of reaction device controller 10 of the vehicle steering apparatus of the second embodiment. A road surface disturbance estimation value Tgs outputted from a disturbance compensator of steering device controller 17 is multiplied by gain Ko by means of gain setting device 10t, thereby generating equivalent road surface μ torque To.

FIG. 9 is a diagram depicting a control block of steering device controller 17 employing a robust model matching technique. Herein, "robust model matching technique" is a technique of previously determining models of vehicle dynamic characteristics that are objects to be controlled and controlling the vehicle so that the vehicle dynamic characteristics coincide with the models while reducing an error in modeling and an influence of disturbance to the minimum.

First, steering device controller 17 includes model matching compensator 17a, disturbance compensator 17b, difference calculator 17c and current limiter 17d.

Model matching compensator 17a is a feed forward compensator that receives, as an input, command motor angle θtam and actual motor angle θtm and outputs a motor command current that causes the response characteristic of the vehicle steering apparatus to coincide with a predetermined response characteristic.

Disturbance compensator 17b is a robust compensator that receives, as an input, the command current that is an input to the controlled object and actual motor angle θtm that is the output from the controlled object and outputs disturbance estimation value Tg that is obtained by estimating, as disturbance, a control obstructing factor including an error in modeling. Further, disturbance estimation value Tg is passed through a high cut-off filter and a low cut-off filter within disturbance compensator 17b to produce TgH and TgL, while at the same time producing road surface disturbance estimation value Tgs that is a difference between TgH and TgL and outputting low frequency component TgL and road surface disturbance estimated value Tgs to reaction device controller 10.

Difference calculator 17c subtracts disturbance estimation value Tg from disturbance compensator 17b from the motor current value from model matching compensator 17a and produces command current free from the disturbance.

Current limiter 17d, when the command current from difference calculator 17c is equal to or lower than a limit current that is the rating of vehicle steering actuator 6, outputs the command current as it is to vehicle steering actuator 6 and when larger than the limit current, outputs the limit current to vehicle steering actuator 6 that is the controlled object.

Then, the operation will be described.

[Steering Reaction Force Control Process]

FIG. 10 is a flowchart showing a steering reaction force control process executed in reaction device controller 10 of the vehicle steering apparatus according to the second embodiment of the present invention. Hereinafter, description will be made to each step of the control process. In the meantime, steps 10-2 to 10-15 execute the same processings as those executed in steps 6-2 to 6-15, respectively and the steps 10-18 to 10-2- execute the same processings as those executed in steps 6-20 to 6-22, respectively, so that repeated description thereto is omitted for brevity and description will be made only to the steps different from the first embodiment.

In step 10-1, reaction motor angle θms from reaction motor angle sensor 9, vehicle speed V from vehicle speed sensor 11 and low frequency component TgL and road surface estimation value Tgs from disturbance compensator 17b of steering device controller 17 in which the robust model matching technique is employed for steering angle control are read. Then, the control proceeds to step 10-2.

In step 10-16, Tc obtained in step 10-15 is subjected to a limiter process by using limit value Ls obtained based on steering angle θs and low frequency component TgL and the result of processing is expressed as Tcl. Then, the control proceeds to step 10-17.

In step 10-17, road surface disturbance estimation value Tgs read in step 10-1 is multiplied by gain Ko and the result of calculation is expressed as equivalent road surface torque To. Then, the control proceeds to step 10-18.

[Operation for Steering Reaction Force Control]

In case steering angle θs is smaller than maximum value θmax that is determined by the displaceable amount of a steered side displacement member, the program control proceeds, in the flowchart of FIG. 10, in the order of step 10-1, step 10-2, step 10-3, step 10-6, step 10-7, step 10-8, step 10-9, 10-10, step 10-11, step 10-12, step 10-13, step 10-14 and step 10-15. In step 10-15, equivalent steering input torque Ts obtained in step 10-9 and equivalent steering output toque Tf are added together, thereby calculating Tc.

Then, in step 10-16, Tc is subjected to a limiter process by using vehicle speed V and steering angle θs read in step 10-1 and limit value Ls obtained from TgL.

Thus, it becomes possible to prevent the steering angle from becoming excessively large when steering angle θs and steering wheel angular velocity dθs/dt become large, thereby preventing steering wheel 1 from being disabled or becoming difficult to be turned further by the driver and making it possible to attain desired steering reaction characteristics corresponding to vehicle characteristics.

Further, since limit value Ls is variably determined by consideration of low frequency component TgL of disturbance estimation value Tg in addition to steering angle θs, Tcl reflecting a steady stage condition can be calculated. For this reason, when a variation of road surface μ causes a variation of the value of the steady state condition, it becomes possible to calculate a steering reaction force in response to the variation of the road surface μ.

In step S10-17, road surface disturbance estimation value Tgs read in step 10-1 is multiplied by gain Ko, thereby calculating equivalent road surface torque To.

The steered side control therefore has a large stability against disturbance. Thus, even in the case application of disturbance from the road surface or the like scarcely causes scarcely any difference between the target steered angle and the actual steered angle, a steering reaction force portion corresponding to a disturbance portion that varies transiently can be added accurately to the steering reaction force by feeding only the disturbance portion estimated by the disturbance compensator 17b of the robust model matching technique back to the steering reaction force side for calculation of the steering reaction force. Since in the steered side control, the disturbance portion is estimated for causing the target steered angle and the actual road wheel angle to coincide with each other and the command current is calculated so as to cancel the disturbance portion, the disturbance portion can be estimated even in the case there is caused scarcely any difference between the target steered angle and the actual steered angle.

Further, since the disturbance portion is estimated by disturbance compensator 17b of the robust model matching technique utilized in the steered angle control while estimating the road surface reaction force by using the difference between the target steered angle and the actual steered angle, it becomes possible to attain more accurate disturbance estimation and imitate the steering reaction force more closely to the vehicle characteristics.

Further, since the disturbance is estimated by using disturbance compensator 17b in the robust model matching technique utilized in the steered angle control, it is not necessitated to an additional disturbance compensator for steering reaction force control.

The vehicle steering apparatus according to the second embodiment can produce the following effects in addition to the effects (1) to (4) of the first embodiment.

(6) Since the steering reaction force control means or section is configured to set motor control command value Tms according to the vehicle driving condition (vehicle speed V, steering angle θs) and the estimation value (low frequency component TgL of disturbance estimation value Tg, road surface disturbance estimation value Tgs) of disturbance estimation device 17b of steering device controller 17, such a detector as the axial force sensor in the first embodiment or a displacement sensor in the conventional apparatus can be dispensed with, thus making it possible to decrease the cost.

(7) Since disturbance estimation device 17b is a robust compensator used in the robust model matching technique which is employed in steering device controller 17 for the purpose of reducing the error in modeling and the influence of disturbance to the minimum, it is not necessitated to provide an additional disturbance estimation device.

The entire contents of Japanese Patent Applications P2004-158211 (filed May 27, 2004) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A vehicle steering apparatus comprising:
   a steering gear that steers steerable road wheels of a vehicle;
   a steered angle controller that controls a steered angle of the road wheels;
   a manual steering unit that is mechanically separated from the steering gear and manually operated for variably controlling a steering angle;
   a steering reaction force actuator that produces a steering reaction force to be applied to the manual steering unit;
   a steering reaction force controller that outputs a steering reaction force command value to the steering reaction actuator; and
   a road surface input torque detector that detects a road surface input torque inputted to the road wheels from a road surface;

wherein the steering reaction force controller includes a low cut-off frequency filter that extracts a low frequency component equal to or lower than a first predetermined frequency from an output of the road surface input torque detector and sets the steering reaction force command value on the basis of a vehicle driving condition and an output of the low cut-off frequency filter.

2. A vehicle steering apparatus according to claim 1, wherein the steering reaction force controller further includes a high cut-off frequency filter that extracts a frequency component equal to or lower than a second predetermined frequency that is higher than the first predetermined frequency from the output of the road surface input torque detector and sets the steering reaction force command value in accordance with the vehicle driving condition and a difference between an output of the high cut-off frequency filter and the output of the low cut-off frequency filter.

3. A vehicle steering apparatus according to claim 1, wherein the steering reaction force controller holds the steering angle constantly at a maximum steering angle when the steering angle reaches the maximum steering angle and sets the steering reaction force command value in a way as to increase the steering reaction force in a pulse-like manner.

4. A vehicle steering apparatus according to claim 1, wherein the steering reaction force actuator comprises a motor having a clutch.

5. A vehicle steering apparatus according to claim 1, wherein the road surface input torque detector comprises an axial force sensor that detects an axial force inputted to a rack shaft of the steering gear.

6. A vehicle steering apparatus comprising:
a steering gear that steers steerable road wheels of a vehicle;
steered angle control means that controls a steered angle of the road wheels;
manual steering means that is mechanically separated from the steering gear and manually operated for variably controlling a steering angle;
a steering reaction force actuator that produces a steering reaction force to be applied the manual steering unit;
steering reaction force control means that outputs a steering reaction force command value to the steering reaction force actuator; and
road surface input torque detecting means that detects a road surface input torque inputted to the road wheels from a road surface;
wherein the steering reaction force control means includes a low cut-off frequency filter that extracts a low frequency component equal to or lower than a first predetermined frequency from an output of the road surface input torque detector and sets the steering reaction force command value on the basis of a vehicle driving condition and an output of the low cut-off frequency filter.

7. A vehicle steering apparatus comprising:
a steering gear that steers steerable road wheels of a vehicle;
a steered angle controller that controls a steered angle of the road wheels;
a manual steering unit that is mechanically separated from the steering gear and manually operated for variably controlling a steering angle;
a steering reaction force actuator that produces a steering reaction force to be applied to the manual steering unit; and a steering reaction force controller that outputs a steering reaction force command value to the steering reaction force actuator,
wherein the steered angle controller includes a disturbance estimation device that estimates a disturbance and determines a disturbance estimation value, and the steering reaction force controller sets the steering reaction force command value in accordance with a vehicle driving condition and the disturbance estimation value estimated by the disturbance estimation device; and
wherein the disturbance estimation device includes a robust compensator used in a robust model matching technique for reducing an error in modeling and an influence of disturbance to the minimum.

8. A vehicle steering apparatus comprising:
a steering gear that steers steerable road wheels of a vehicle;
steered angle control means for controlling a steered angle of the road wheels;
manual steering means mechanically separated from the steering gear and manually operation for variably controlling a steering angle;
a steering reaction force actuator that produces a steering reaction force to be applied to the manual steering means; and
steering reaction force control means for outputting a steering reaction force command value to the steering reaction force actuator;
wherein the steered angle control means includes a disturbance estimation device that estimates a disturbance and determines a disturbance estimation value, and the steering reaction force control means sets the steering reaction force command value in accordance with a vehicle driving condition and the disturbance estimation value estimated by the disturbance estimation device; and
wherein the disturbance estimation device includes a robust compensator used in a robust model matching techniciue for reducing an error in modeling and an influence of disturbance to the minimum.

9. A steering method for a vehicle including a steering gear that steers steerable road wheels of a vehicle, a steered angle controller that controls a steered angle of the road wheels, a manual steering unit that is mechanically separated from the steering gear and manually operated for variably controlling a steering angle, a steering reaction force actuator that produces a steering reaction force to be applied to the manual steering unit, and a steering reaction force controller that outputs a steering reaction force command value to the steering reaction force actuator, the steering method comprising:
detecting a road surface input torque inputted to the road wheels from a road surface and producing an output representative thereof;
extracting a frequency component equal to or lower than a first predetermined frequency from the output; and
setting the steering reaction force command value on the basis of a vehicle driving condition and the output from which the low frequency component equal to or lower than the predetermined first frequency is extracted.

10. A steering method according to claim 9, further comprising extracting a frequency component equal to or lower than a second predetermined frequency that is higher than the first predetermined frequency from the output, wherein the setting further comprises setting the steering reaction force command value in accordance with the vehicle driving condition and a difference between the output from which the frequency component equal to or lower than the first predetermined frequency is extracted and the output from which the frequency component equal to or lower than the second predetermined frequency is extracted.

11. A steering method for a vehicle including a steering gear that steers steerable road wheels of a vehicle, a steered angle controller that controls a steered angle of the road wheels, a manual steering unit that is mechanically separated from the steering gear and manually operated for variably controlling a steering angle, a steering reaction force actuator that produces a steering reaction force to be applied to the manual steering unit, and a steering reaction force controller that outputs a steering reaction force command value to the steering reaction force actuator, the steering method comprising:

estimating a disturbance and determining a disturbance estimation value; and setting the steering reaction force command value in accordance with a vehicle driving condition and the disturbance estimation value;

wherein the estimating includes using a robust model matching technique for reducing an error in modeling and an influence of disturbance to the minimum.

* * * * *